(12) United States Patent
Kuribayashi

(10) Patent No.: US 10,428,872 B2
(45) Date of Patent: Oct. 1, 2019

(54) GUIDE APPARATUS AND EQUIPMENT USING THE SAME

(71) Applicant: THK CO., LTD., Tokyo (JP)

(72) Inventor: Hiroomi Kuribayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/737,435

(22) PCT Filed: Jun. 28, 2016

(86) PCT No.: PCT/JP2016/069114
§ 371 (c)(1),
(2) Date: Dec. 18, 2017

(87) PCT Pub. No.: WO2017/006806
PCT Pub. Date: Jan. 12, 2017

(65) Prior Publication Data
US 2018/0172071 A1    Jun. 21, 2018

(30) Foreign Application Priority Data

Jul. 3, 2015    (JP) ................................ 2015-134157
Jun. 28, 2016   (JP) ................................ 2016-127282

(51) Int. Cl.
*F16C 29/12*    (2006.01)
*F16C 29/06*    (2006.01)
(Continued)

(52) U.S. Cl.
CPC ............ *F16C 29/12* (2013.01); *A47B 88/477* (2017.01); *F16C 29/00* (2013.01); *F16C 29/046* (2013.01);
(Continued)

(58) Field of Classification Search
CPC ..... A47B 88/40; A47B 88/473; A47B 88/477; A47B 88/493; A47B 88/10; A47B 88/08;
(Continued)

(56) References Cited

U.S. PATENT DOCUMENTS 4,696,582 A * 9/1987 Kasten ................. A47B 88/493
                                                         384/18
5,356,207 A   10/1994 Rock et al.
(Continued)

FOREIGN PATENT DOCUMENTS

DE    102013217712    *  3/2015   .......... A47B 88/477
JP       1-90438 U       6/1989
JP       5-76429 A       3/1993

OTHER PUBLICATIONS

International Search Report dated Aug. 23, 2016, issued in counterpart International Application No. PCT/JP2016/069114 (2 pages).
(Continued)

*Primary Examiner* — Andrew M Roersma
(74) *Attorney, Agent, or Firm* — Westerman, Hattori, Daniels & Adrian, LLP

(57) ABSTRACT

A guide apparatus is provided which can increase a holding force that holds a table, a drawer, a cabinet, a device, or the like at a predetermined position. An engagement body (43) is placed on a second member (42b). A pair of plate spring portions (44a and 44b) is placed on a first member (41) in such a manner as to sandwich the engagement body (43). The pair of plate spring portions (44a and 44b) bend in such a manner that a minimum dimension between the pair of plate spring portions (44a and 44b) is smaller than a dimension (length) of the engagement body (43). In a state where the engagement body (43) has gone beyond a minimum dimension position (53) between the pair of plate spring portions (44a and 44b) and the second member (42b) is being held at a predetermined position on the first member
(Continued)

(41), the minimum dimension between the pair of plate spring portions (44a and 44b) is smaller than the dimension (length) of the engagement body (43), and both end portions (44a1, 44a3, 44b1, and 44b3), in a length direction, of the plate spring portions (44a and 44b) are supported by the first member (41).

16 Claims, 14 Drawing Sheets

(51) Int. Cl.
    *A47B 88/47*         (2017.01)
    *F16C 29/00*         (2006.01)
    *F16C 29/04*         (2006.01)
    *A47B 88/49*         (2017.01)
    *A47B 1/10*          (2006.01)
    *A47B 88/50*         (2017.01)
    *A47B 88/477*        (2017.01)
    *A47B 88/493*        (2017.01)
    *A47B 88/473*        (2017.01)

(52) U.S. Cl.
    CPC ............... *F16C 29/06* (2013.01); *A47B 1/10* (2013.01); *A47B 88/473* (2017.01); *A47B 88/493* (2017.01); *A47B 88/50* (2017.01); *A47B 2210/0016* (2013.01); *A47B 2210/0032* (2013.01); *F16C 2314/72* (2013.01)

(58) Field of Classification Search
    CPC ......... A47B 88/49; A47B 88/57; A47B 88/16; A47B 2210/0016; A47B 2210/0018; A47B 2210/0081; A47B 2210/0059; A47B 1/10; F16C 29/12; F16C 2314/72
    See application file for complete search history.

(56) References Cited

U.S. PATENT DOCUMENTS

| | | | | |
|---|---|---|---|---|
| 5,951,132 A | * | 9/1999 | Cirocco | A47B 88/493 312/334.11 |
| 6,789,862 B2 | * | 9/2004 | Shih-Long | A47B 88/49 312/334.46 |
| 8,540,328 B2 | * | 9/2013 | Chen | A47B 88/57 312/333 |
| 2003/0209959 A1 | * | 11/2003 | Shih-Long | A47B 88/49 312/334.46 |
| 2007/0182294 A1 | * | 8/2007 | Hung | A47B 88/493 312/334.46 |
| 2008/0303399 A1 | * | 12/2008 | Huang | A47B 88/49 312/334.46 |

OTHER PUBLICATIONS

Extended (supplementary) European Search Report dated Nov. 23, 2018, issued in counterpart European Application No. 16821275.1. (7 pages).

* cited by examiner

CROSS-SECTIONAL VIEW ALONG LINE III-III

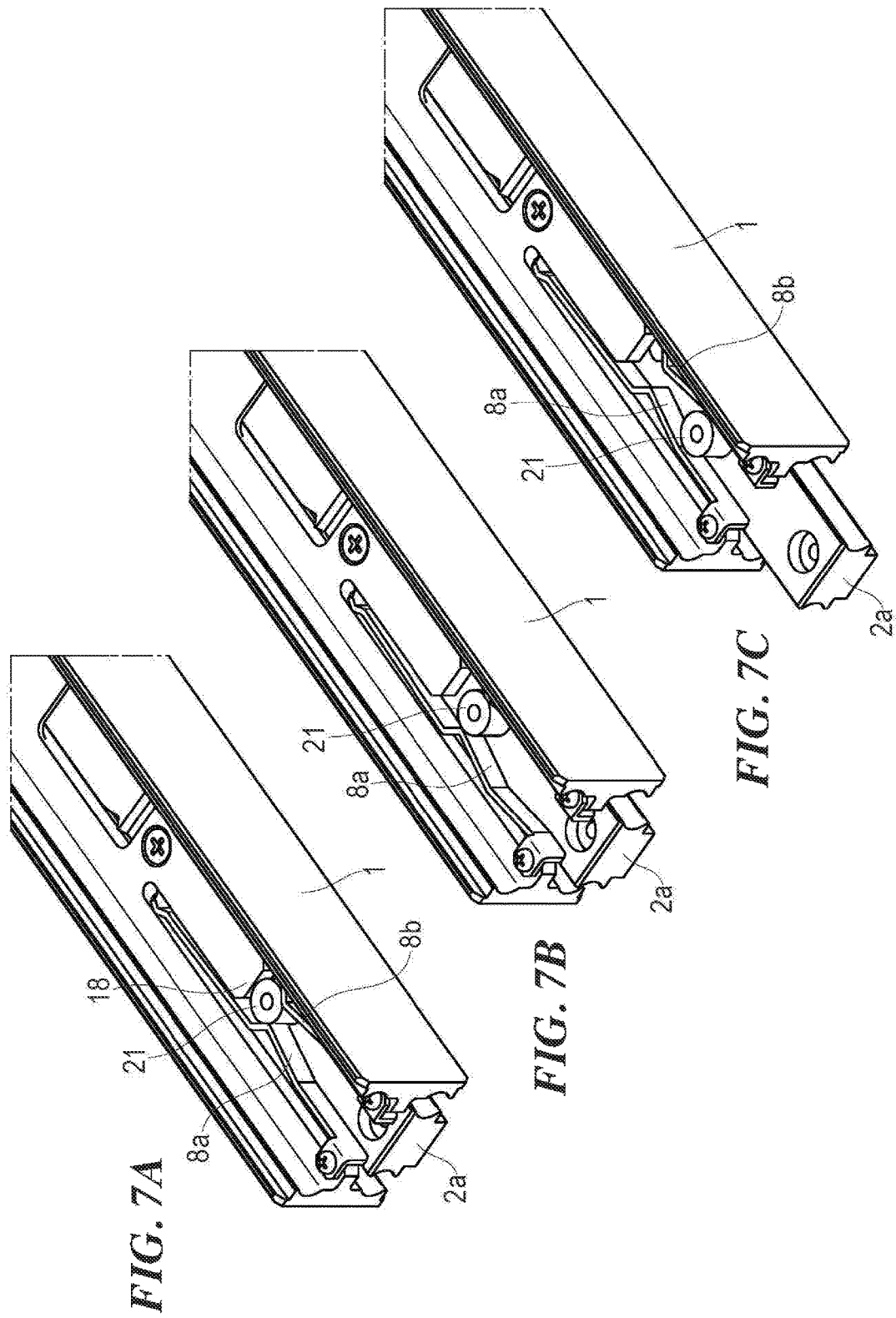

CROSS-SECTIONAL VIEW ALONG LINE X-X

GUIDE APPARATUS AND EQUIPMENT USING THE SAME

TECHNICAL FIELD

The present invention relates to a guide apparatus that guides a table, a drawer, a cabinet, a device, or the like in such a manner as to pull it in and/or out, and equipment using the guide apparatus.

BACKGROUND ART

A slide rail including an outer rail and an inner rail slidably assembled to the outer rail via rolling elements is known as this type of guide apparatus. For example, the inner rail is attached to a table or the like, and the outer rail to a main body.

Tables and the like may start moving by an unexpected force upon being housed or pulled out. In order to prevent it, a position holding mechanism for holding the position of the inner rail is integrated in the slide rail. As a known position holding mechanism, one which provides a rotary latch to the outer rail in a rotatable manner, biases the rotary latch toward the inner rail by a torsion spring, and holds the inner rail by the friction force produced between the rotary latch and the inner rail is known.

Moreover, another position holding mechanism is also known which includes a pair of plate spring portions on the outer rail, sandwiches an engagement body placed on the inner rail between the pair of plate spring portions, and holds the inner rail by the elastic force of the pair of plate spring portions (refer to Patent Literature 1).

CITATION LIST

Patent Literature

Patent Literature 1: JP 5-76429 A

SUMMARY OF INVENTION

Technical Problem

However, the known position holding mechanism has an issue that if the holding force of the inner rail is small, and the unexpected force acting on a table or the like is large, or if the table or the like is heavy, the inner rail cannot be held at a predetermined position.

Hence, the present invention provides a guide apparatus that can increase the holding force of a table, a drawer, a cabinet, a device, or the like.

Solution to Problem

To solve the above problem, an aspect of the present invention is a guide apparatus including: a first member; a second member assembled to the first member in such a manner as to be relatively movable in a length direction; an engagement body placed on the second member; and a pair of plate spring portions placed on the first member in such a manner as to sandwich the engagement body, wherein the pair of plate spring portions bends in such a manner that a minimum dimension between the pair of plate spring portions is smaller than a dimension of the engagement body, and in a state where the engagement body has gone beyond a minimum dimension position between the pair of plate spring portions and the second member is being held at a predetermined position on the first member, the minimum dimension between the pair of plate spring portions is smaller than the dimension of the engagement body, and both end portions, in the length direction, of each plate spring portion are supported by the first member.

Advantageous Effects of Invention

According to the present invention, the plate spring portion is not cantilevered by a first member, but is supported at both end portions. Hence, it is possible to increase the spring force of the bent plate spring portion, and increase the holding force that holds a second member at the predetermined position. Moreover, even if the plate spring portion is made compact, a strong spring force can be obtained. Accordingly, a compact position holding mechanism can be realized.

BRIEF DESCRIPTION OF DRAWINGS

FIGS. 7A to 7C are perspective views of the operation of the position holding mechanism of the slide rail (FIG. 7A illustrates the state where the shaft is in contact with the stopper, FIG. 7B illustrates the state where the shaft passes the minimum dimension positions of the plate spring portions, and FIG. 7C illustrates the state where the shaft passes the second inclined portions of the plate spring portions).

BEST MODE FOR CARRYING OUT THE INVENTION

A slide rail being an embodiment of a guide apparatus of the present invention is described in detail hereinafter with reference to the accompanying drawings. However, the present invention can be embodied in various modes, and is not limited to embodiments described in the description. The embodiments are provided with the intention of enabling those skilled in the art to fully understand the scope of the invention by disclosing the description sufficiently.

Figure 1:
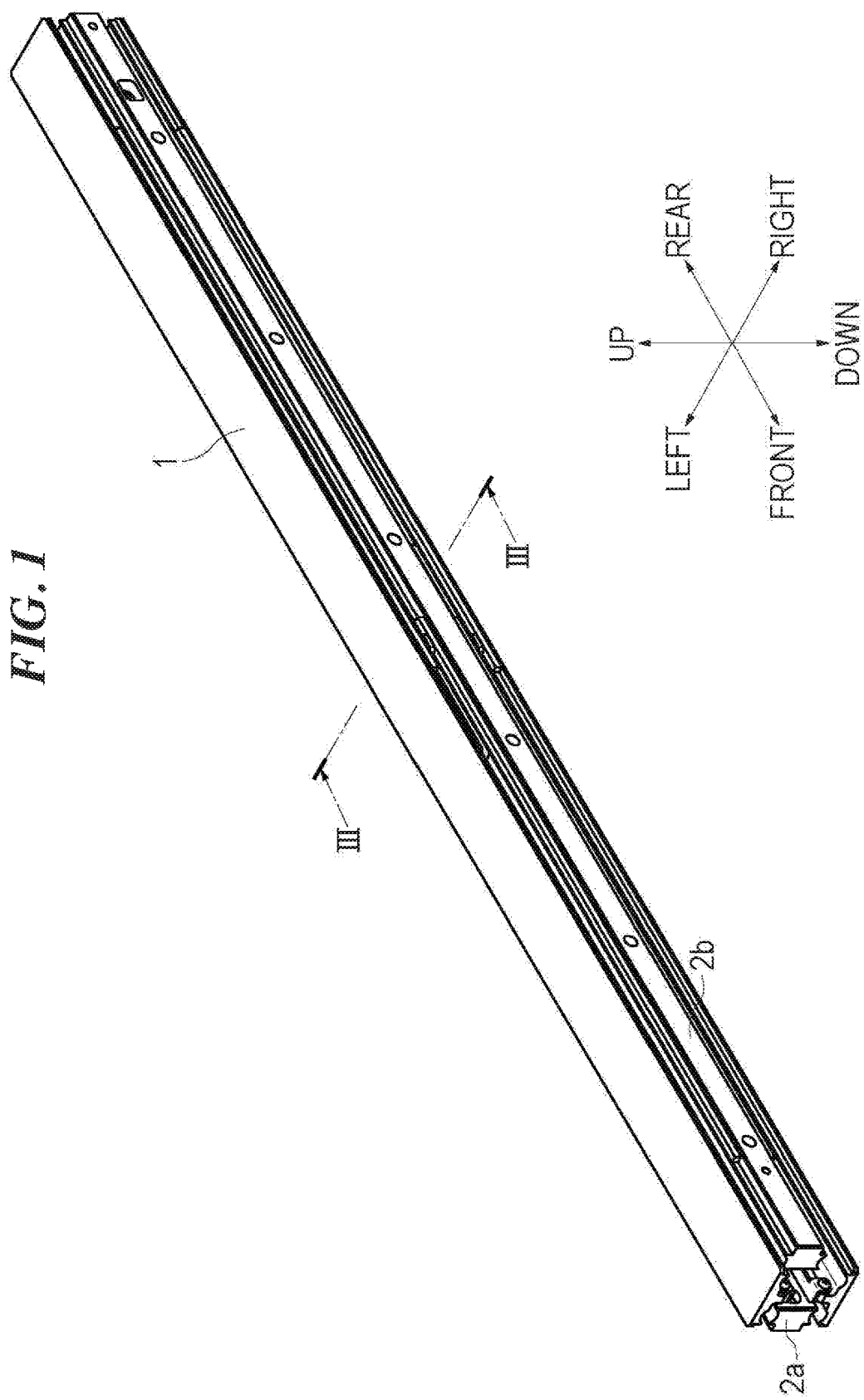
FIG. 1 is a perspective view of a slide rail of a first embodiment of the present invention (a state where inner rails have been pulled in).
Figure 2:
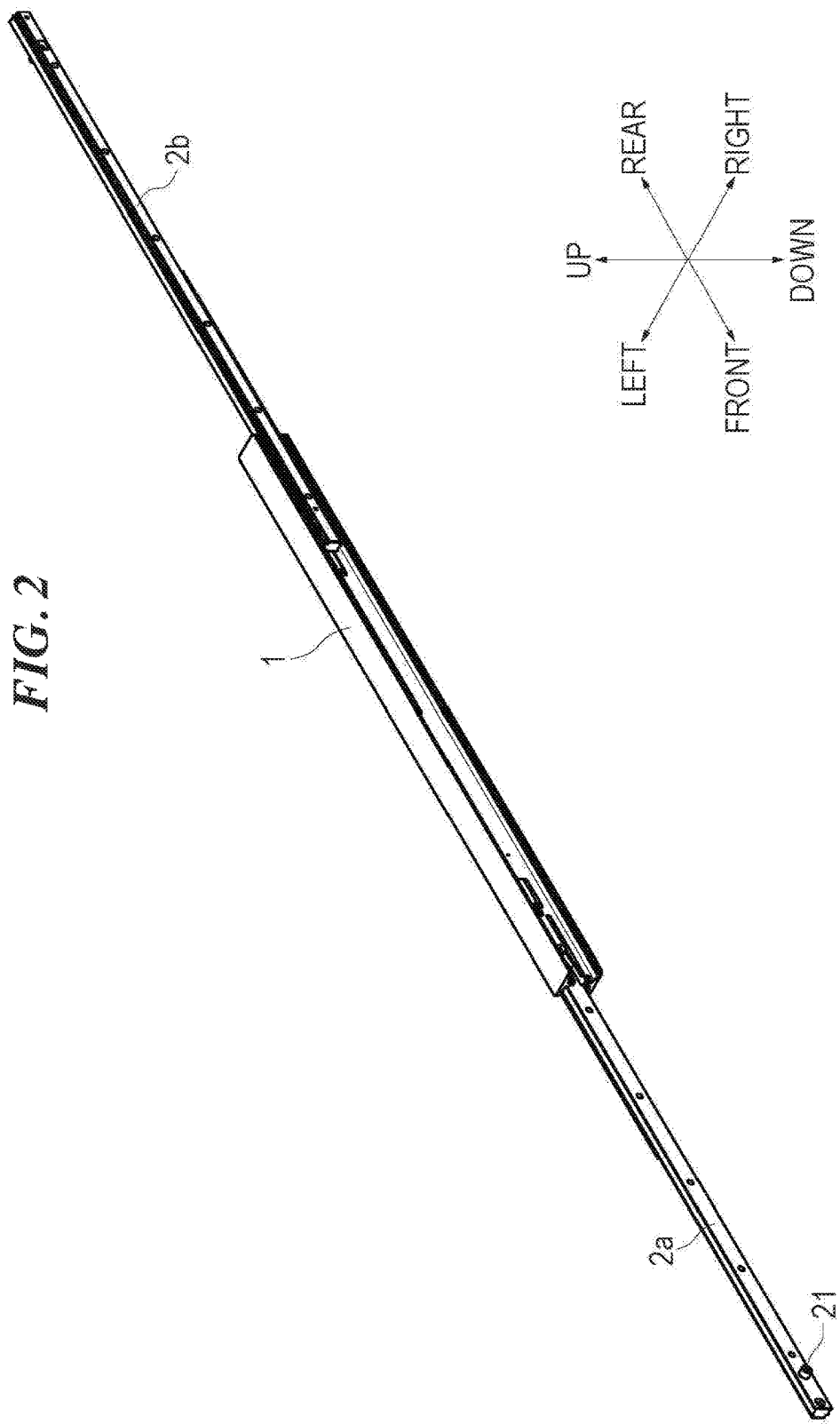
FIG. 2 is a perspective view of the slide rail (a state where the inner rails have been pulled out).
Figure 3:
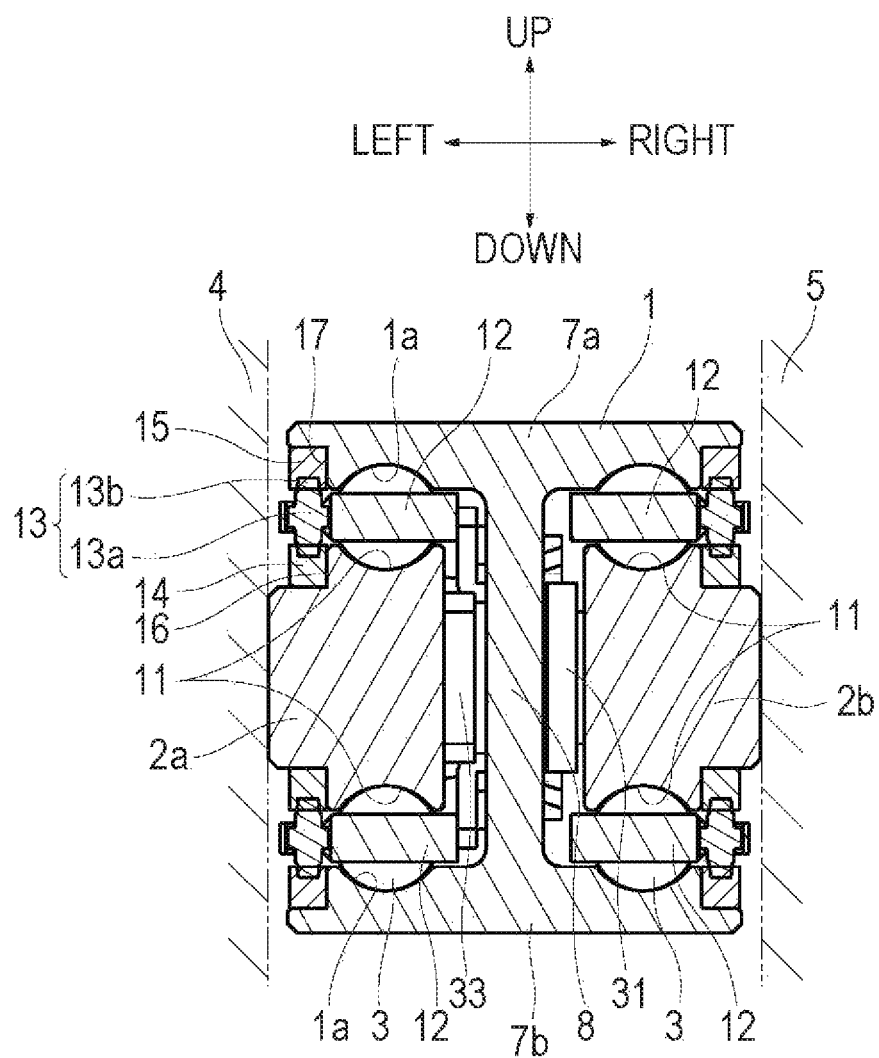
FIG. 3 is a cross-sectional view taken along line of FIG. 1.

FIGS. 1 to 3 illustrate a slide rail of a first embodiment of the present invention. The slide rail includes an outer rail 1 as a first member, and inner rails 2a and 2b as second members. The inner rails 2a and 2b are assembled to the outer rail 1 in such a manner as to be slidable in a length direction (the front-and-rear direction in the drawings) from a pull-in position to a pull-out position. For example, the inner rail 2a is attached to, for example, a table or drawer 4, and the inner rail 2b is attached to a main body 5 (refer to FIG. 3). A plurality of balls 3 is interposed as rolling elements between the outer rail 1 and the inner rails 2a and 2b. The slide rail is used for, for example, equipment that enables a table, a drawer, a cabinet, a device, or the like to be pulled in and/or out.

FIG. 1 is a perspective view of the slide rail where the inner rails 2a and 2b have been pulled in. FIG. 2 is a perspective view of the slide rail where the inner rails 2a and 2b have been pulled out. The two inner rails 2a and 2b are assembled to the H-shaped outer rail 1. The two inner rails 2a and 2b are pulled out in directions opposite to each other to ensure the stroke of the slide rail.

For convenience of description, the configuration of the slide rail is described below, using the front-and-rear direction, the left-and-right direction, and the up-and-down direction illustrated in FIGS. 1 to 3. Naturally, the placement of the slide rail is not limited to such a placement.

As illustrated in a cross-sectional view of FIG. 3, the outer rail 1 has an H-shaped cross section, and includes a pair of upper and lower side walls 7a and 7b, and a connecting wall 8 that links the side walls 7a and 7b. The side walls 7a and 7b and the connecting wall 8 are integrally formed. The outer rail 1 is integrally formed with the H shape cross section. Accordingly, it is possible to promote a reduction in wall thickness and weight of the connecting wall 8 as compared to a case where two U- or C-shaped channels are coupled back to back.

The inner rails 2a and 2b are sandwiched via the balls 3 between the pair of upper and lower side walls 7a and 7b in such a manner as to be slidable in the front-and-rear direction (a direction orthogonal to the paper surface). The cross sections of the inner rails 2a and 2b are substantially square. The inner rails 2a and 2b are placed on the left and right of the connecting wall 8 of the bilaterally symmetrical outer rail 1.

The inner rails 2a and 2b are simply different in a pull-out direction and have the same configuration. The configurations of the left inner rail 2a and the left half of the outer rail 1 are described below. The same reference numerals are assigned to the right inner rail 2b and the right half of the outer rail 1, and their description is omitted.

A ball rolling groove 1a being a single thread as a rolling element rolling groove is formed in an inner surface of each of the upper and lower side walls 7a and 7b of the outer rail 1. A ball rolling groove 11 being a single thread facing the ball rolling groove 1a is formed in each of upper and lower side surfaces of the inner rail 2a. The balls 3 are interposed between the ball rolling groove 1a and the ball rolling groove 11. The balls 3 are held by a plate-shaped cage 12. The cross sections of the ball rolling grooves 1a and 11 are formed in, for example, a circular arc groove being a single arc.

A downward load acts on the inner rail 2a from, for example, the table or drawer 4. However, a force that pulls out the inner rail 2a from the outer rail 1 (a force toward the left in the drawings) is hard to act. Hence, the cross sections of the ball rolling grooves 1a and 11 can be formed in the circular arc groove. Moreover, the cross sections of the ball rolling grooves 1a and 11 are formed in the circular arc groove to enable the prevention of the displacement of the cage 12 holding the balls 3.

A pinion 13 is rotatably fitted to the cage 12 holding the balls 3. Racks 14 and 15 that engage with the pinion 13 are attached to the outer rail 1 and the inner rail 2a. The pinion 13 is rotatably fitted into a hole formed in the cage 12. A rotation shaft 13a of the pinion 13 is oriented in the left-and-right direction to guide the rotation of the rotation shaft 13a along the hole of the cage 12. A gear portion 13b of the pinion 13 protrudes in the up-and-down direction from the hole of the cage 12 to engage with the racks 14 and 15. The racks 14 and 15 are attached to recess portions 16 and 17 of the inner rail 2a and the outer rail 1 in such a manner as to prevent the pinion 13 and the racks 14 and 15 from interfering with a mounting surface of, for example, the table or drawer 4. When the inner rail 2a slides with respect to the outer rail 1, the pinion 13 moves by half the slide amount of the inner rail 2a. The cage 12 moves with the movement of the pinion 13. Accordingly, the displacement of the cage 12 can be prevented.

As illustrated in FIG. 1, when the inner rail 2a is pulled in, the inner rail 2a stops at the pull-in position being a predetermined position, and a position holding mechanism holds the position of the inner rail 2a. On the other hand, as illustrated in FIG. 2, when the inner rail 2a is pulled out, the inner rail 2a stops at the pull-out position, and a stopper mechanism holds the pull-out position of the inner rail 2a. The configurations of the position holding mechanism and the stopper mechanism are described in turn below.

Figure 4:
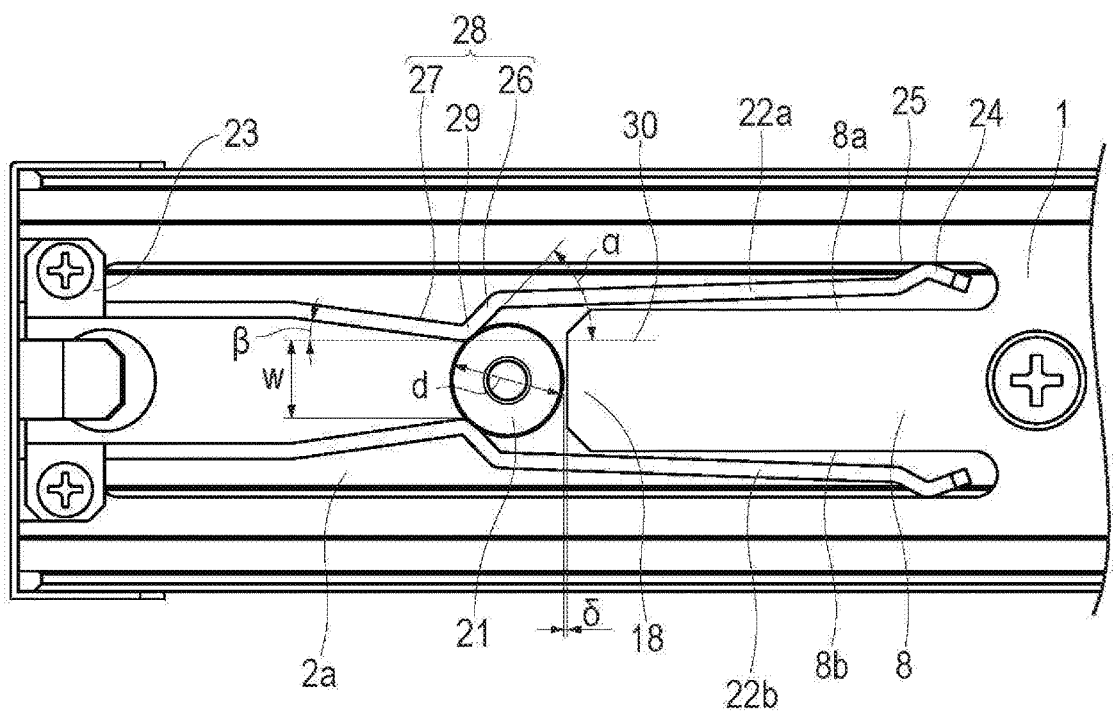
FIG. 4 is a side view of an end portion of the slide rail.
Figure 5:
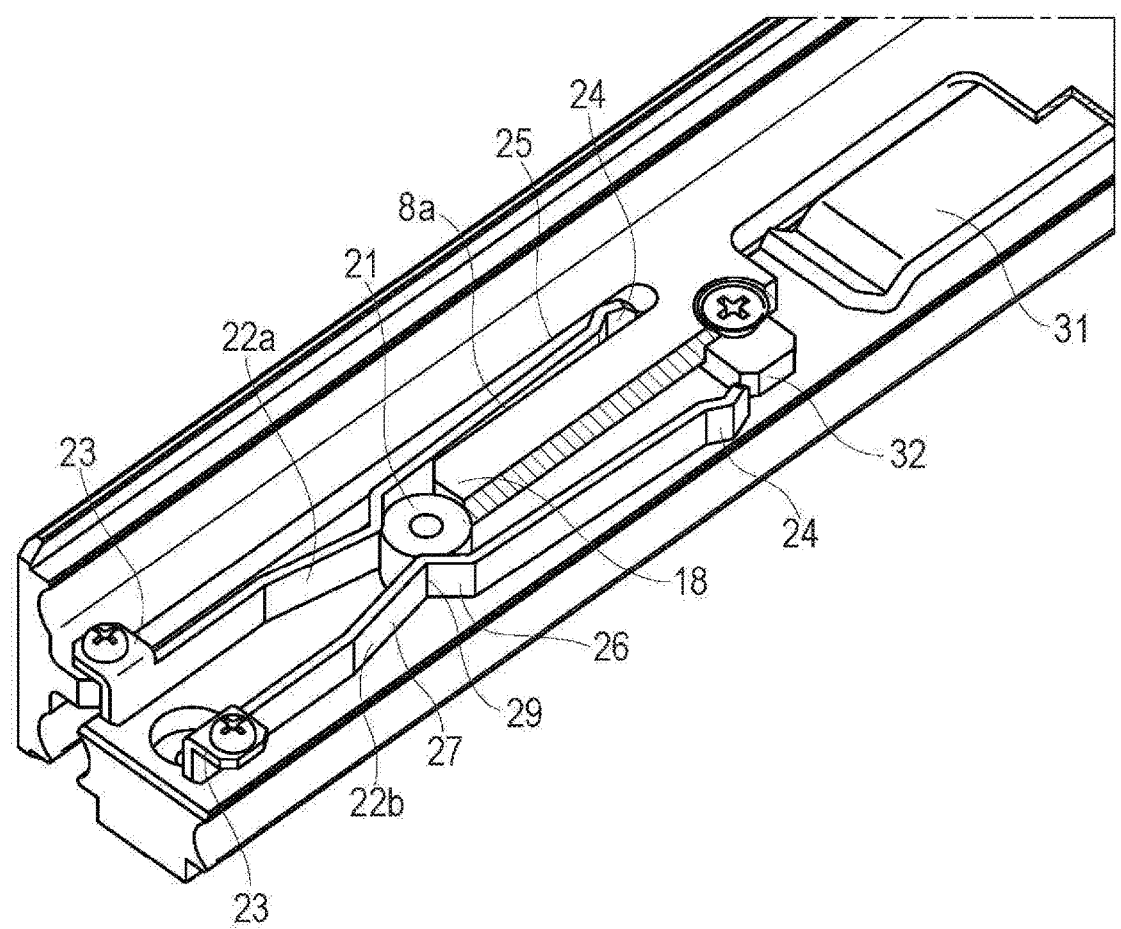
FIG. 5 is a perspective view (including a partial cross-sectional view) of the end portion of the slide rail.

FIG. 4 illustrates a side view of an end portion of the slide rail. FIG. 5 illustrates a perspective view (including a partial cross-sectional view) of the end portion of the slide rail. In FIGS. 4 and 5, one of the inner rails 2b, has been removed to illustrate the position holding mechanism in an easy-to-understand manner.

The position holding mechanism includes a shaft 21 as an engagement body placed on the inner rail 2a, and a pair of plate spring portions 22a and 22b that is placed on the outer rail 1 in such a manner as to sandwich the shaft 21. The plate spring portions 22a and 22b are long and slender in the length direction of the outer rail 1, and are substantially parallel to each other. Notches 8a and 8b that are long and slender in the length direction are formed in an end portion, in the length direction, of the connecting wall 8 of the outer rail 1. Parts of the plate spring portions 22a and 22b are housed in the notches 8a and 8b. A stopper 18 is formed between the notches 8a and 8b. The notches 8a and 8b are formed in the connecting wall 8 of the outer rail 1, and the stopper 18 is formed between the notches 8a and 8b. Accordingly, the plate spring portions 22a and 22b and the stopper 18 can be placed on the outer rail 1 in a compact manner.

The shaft 21 has a circular cross section, and is attached to the inner rail 2a (refer to FIG. 2). When the inner rail 2a is at the pull-in position as illustrated in FIG. 4, the shaft 21 of the inner rail 2a is in contact with the stopper 18 of the outer rail 1. Consequently, further sliding of the inner rail 2a at the pull-in position in a pull-in direction is restricted.

Both end portions of each of the plate spring portions 22a and 22b are supported by the outer rail 1. As illustrated in FIG. 5, one end portions 23 of the plate spring portions 22a and 22b are fixed by fastening members such as screws to the outer rail 1. The other end portions 24 of the plate spring portions 22a and 22b are supported by support surfaces 25 (wall surfaces of the notches 8a and 8b) of the outer rail 1 in such a manner as to be movable in the length direction. The other end portions 24 of the plate spring portions 22a and 22b bend, in convex form, toward the support surfaces 25. The thickness and height of the plate spring portions 22a and 22b are not limited. For example, the height of the plate spring portions 22a and 22b can be made equal to the thickness of the connecting wall 8. Moreover, the pair of plate spring portions 22a and 22b can also be connected near the one end portions 23 to facilitate its manufacture.

As illustrated in FIG. 4, the plate spring portions 22a and 22b bend in such a manner that a minimum dimension w between the plate spring portions 22a and 22b is smaller than a diameter d (dimension d) of the shaft 21. First linear inclined portions 26 are formed on the stopper 18 side with respect to minimum dimension positions 29 of the plate spring portions 22a and 22b. A first angle α formed by the first inclined portion 26 and a length direction 30 is set to equal to or greater than 30° and equal to or less than 70°, more preferably equal to or greater than 40° and equal to or less than 50°. Second linear inclined portions 27 are formed on the opposite side to the first inclined portions 26 across the minimum dimension positions 29 of the plate spring portions 22a and 22b. A second angle β formed by the second inclined portion 27 and the length direction 30 is set smaller than the first angle α, for example, equal to or greater than 5° and equal to or less than 30°. The first inclined portion 26 and the second inclined portion 27 form a constricted portion 28.

When the inner rail 2a slides from the pull-out position to the pull-in position, the shaft 21 of the inner rail 2a goes beyond the minimum dimension positions 29 of the plate spring portions 22a and 22b. The shaft 21 is then sandwiched between the first inclined portions 26 and the stopper 18. In order to ensure that, for example, the table or drawer 4 is housed in the main body 5, it is also possible to provide slight clearance δ between the shaft 21 and the stopper 18 in a state where the shaft 21 is in contact with the first inclined portions 26.

Figure 6A:
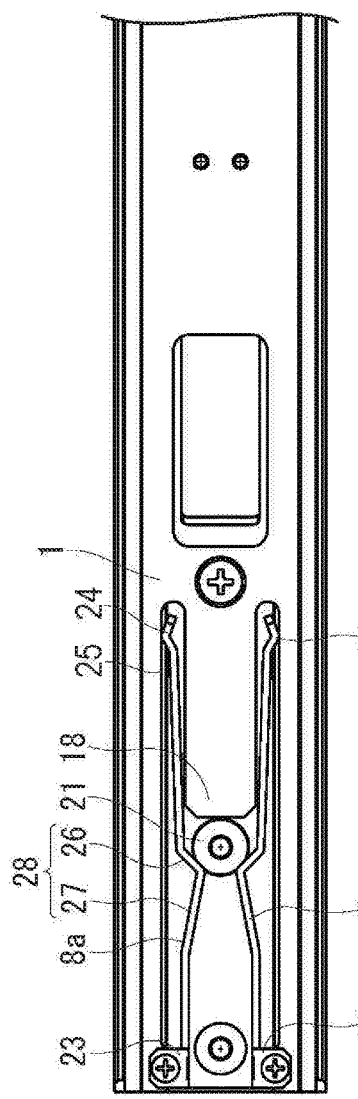
FIGS. 6A to 6C are side views of the operation of a position holding mechanism of the slide rail (FIG. 6A illustrates a state where a shaft is in contact with a stopper, FIG. 6B illustrates a state where the shaft passes minimum dimension positions of plate spring portions, and FIG. 6C illustrates a state where the shaft passes second inclined portions of the plate spring portions).
Figure 6B:
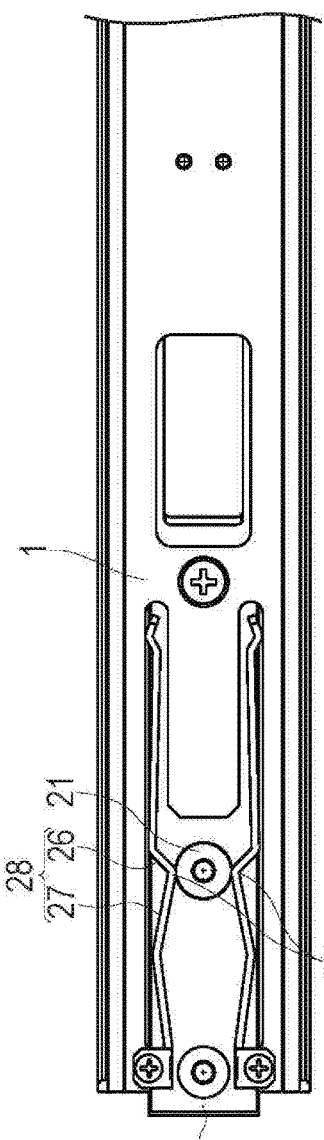
Figure 6C:
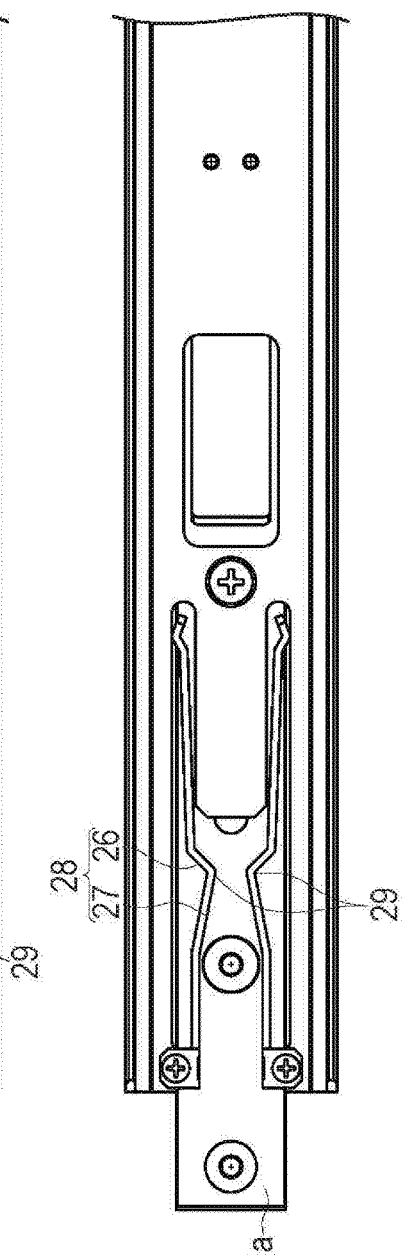

FIGS. 6A to 6C and 7A to 7C illustrate operation diagrams of the position holding mechanism of when the inner rail 2a at the pull-in position is pulled out. FIGS. 6A and 7A illustrate a state where the shaft 21 is in contact with the stopper 18 (the pull-in position of the inner rail 2a). FIGS. 6B and 7B illustrate a state where the shaft 21 passes the minimum dimension positions 29 of the plate spring portions 22a and 22b. FIGS. 6C and 7C illustrate a state where the shaft 21 passes the second inclined portions 27 of the plate spring portions 22a and 22b.

As illustrated in FIG. 6A, when the inner rail 2a at the pull-in position is pulled out, the shaft 21 bends the constricted portions 28 of the plate spring portions 22a and 22b in such a manner as to expand the constricted portions 28. The plate spring portions 22a and 22b are supported at both end portions 23 and 24 by the outer rail 1. When the shaft 21 bends the plate spring portions 22a and 22b, a strong spring force occurs on the plate spring portions 22a and 22b. Hence, a holding force that holds the inner rail 2a at the pull-in position can be increased.

Moreover, at this point in time, the plate spring portions 22a and 22b deform in such a manner as to stretch. The other end portions 24 of the plate spring portions 22a and 22b are slidably supported by the support surfaces 25 of the outer rail 1. Accordingly, it is possible to release the stretches of the plate spring portions 22a and 22b and prevent the occurrence of excessive stress on the plate spring portions 22a and 22b. The other end portions 24 of the plate spring portions 22a and 22b bend, in convex form, toward the support surfaces 25, and accordingly, smoothly slide along the support surfaces 25.

Furthermore, the first angle α (refer to FIG. 4) of the first inclined portion 26 is set to equal to or greater than 30° and equal to or less than 70°. Accordingly, the maximum possible holding force can be obtained. When the first angle α of the first inclined portion 26 is less than 30°, the bending amount of the plate spring portions 22a and 22b is reduced, and the spring force of the plate spring portions 22a and 22b is also reduced. On the other hand, when the first angle α of the first inclined portion 26 exceeds 70°, the first inclined portion 26 becomes like a wall. Accordingly, it becomes difficult to bend the plate spring portions 22a and 22b. Furthermore, when the first angle α is set to equal to or greater than 40° and equal to or less than 50°, a significant effect can be obtained.

As illustrated in FIGS. 6B and 6C, the second inclined portions 27 apply a force in the pull-out direction to the shaft 21 after the shaft 21 passes the minimum dimension positions 29. Hence, the inner rail 2a is smoothly pulled out.

Contrary to the above description, when the inner rail 2a is slid from the pull-out position to the pull-in position, the shaft 21 passes the second inclined portions 27 as illustrated in FIG. 6C. The second angle β (refer to FIG. 4) of the second inclined portion 27 is smaller than the first angle α of the first inclined portion 26. Accordingly, the spring force occurring on the plate spring portions 22a and 22b is small. Hence, the shaft 21 can go beyond the minimum dimension positions 29 with a small force. As illustrated in FIG. 6A, the plate spring portions 22a and 22b hold the shaft 21 at the predetermined position where the shaft 21 is in contact with the stopper 18, in a state where the shaft 21 has gone beyond the minimum dimension positions 29.

The configuration of the stopper mechanism that holds the pull-out position of the inner rail 2a is as described below. As illustrated in FIG. 5, the stopper mechanism includes a plate spring portion 31 attached to the outer rail 1, a stopper 32 attached to the outer rail 1, and a stopper 33 (refer to FIG. 3) attached to the inner rail 2a. The plate spring portion 31 is cantilevered by the outer rail 1. A distal end of the plate spring portion 31 bends, in convex form, toward the inner rail 2a. A window is formed in the outer rail 1 in such a manner that the plate spring portion 31 can deform. Although not illustrated, when the inner rail 2a is at the pull-out position, the stopper 33 of the inner rail 2a goes beyond the distal end of the plate spring portion 31 to come into contact with the stopper 32 of the outer rail 1. At this point in time, the plate spring portion 31 holds the position of the stopper 33 of the inner rail 2a with the spring force.

Figure 8:
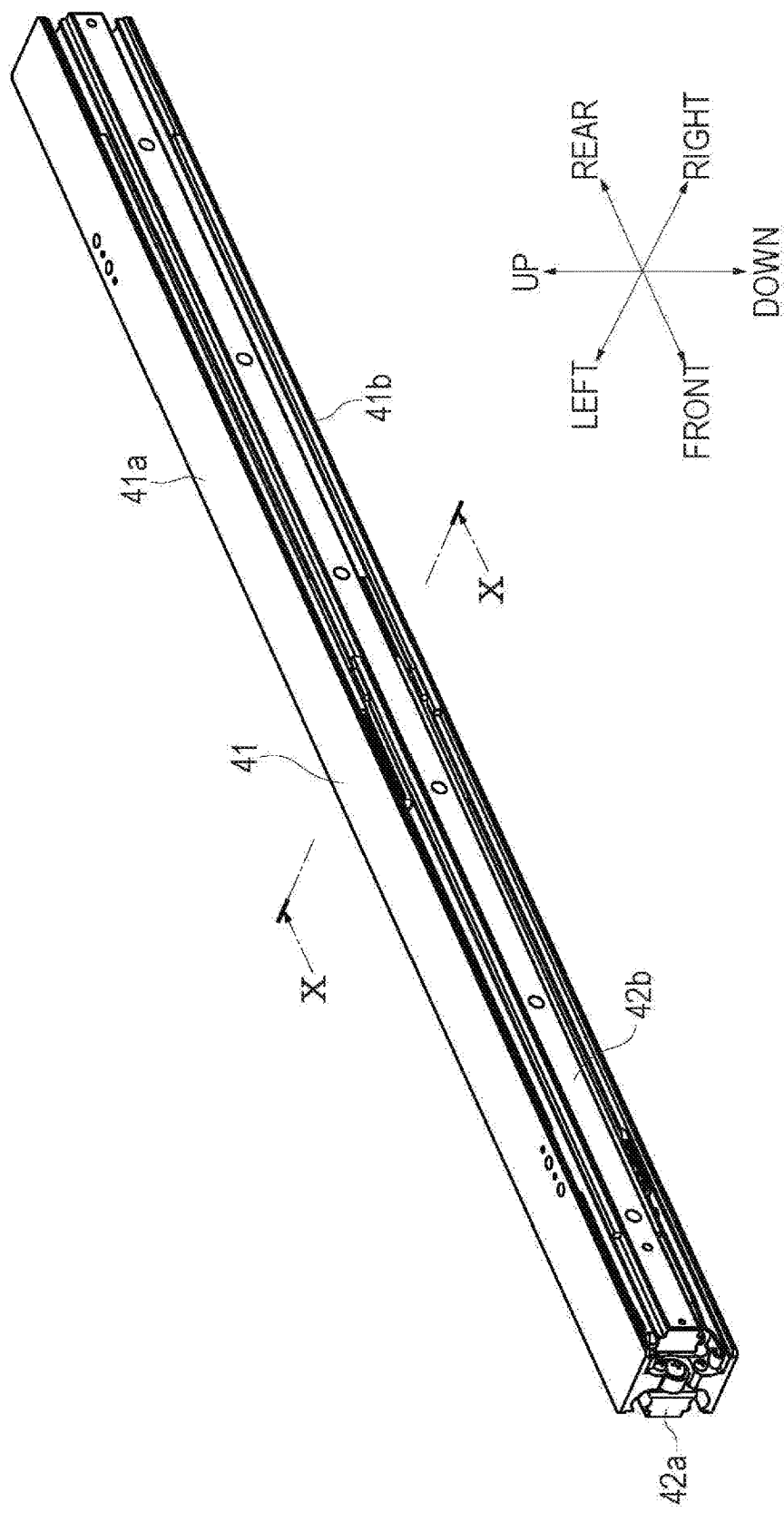
FIG. 8 is a perspective view of a slide rail of a second embodiment of the present invention (a state where inner rails have been pulled in).
Figure 9:
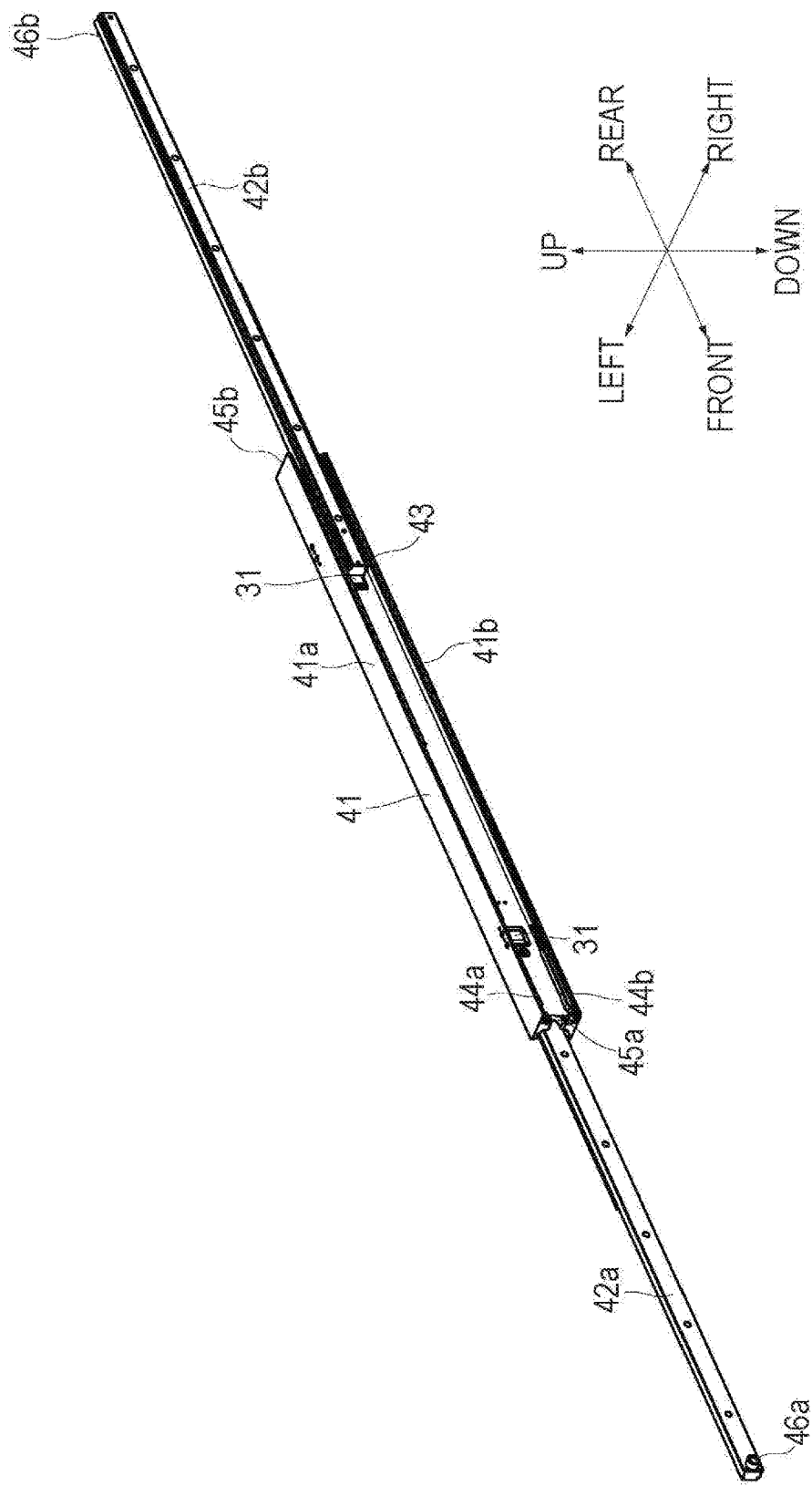
FIG. 9 is a perspective view of the slide rail of the second embodiment of the present invention (a state where the inner rails have been pulled out).
Figure 10:
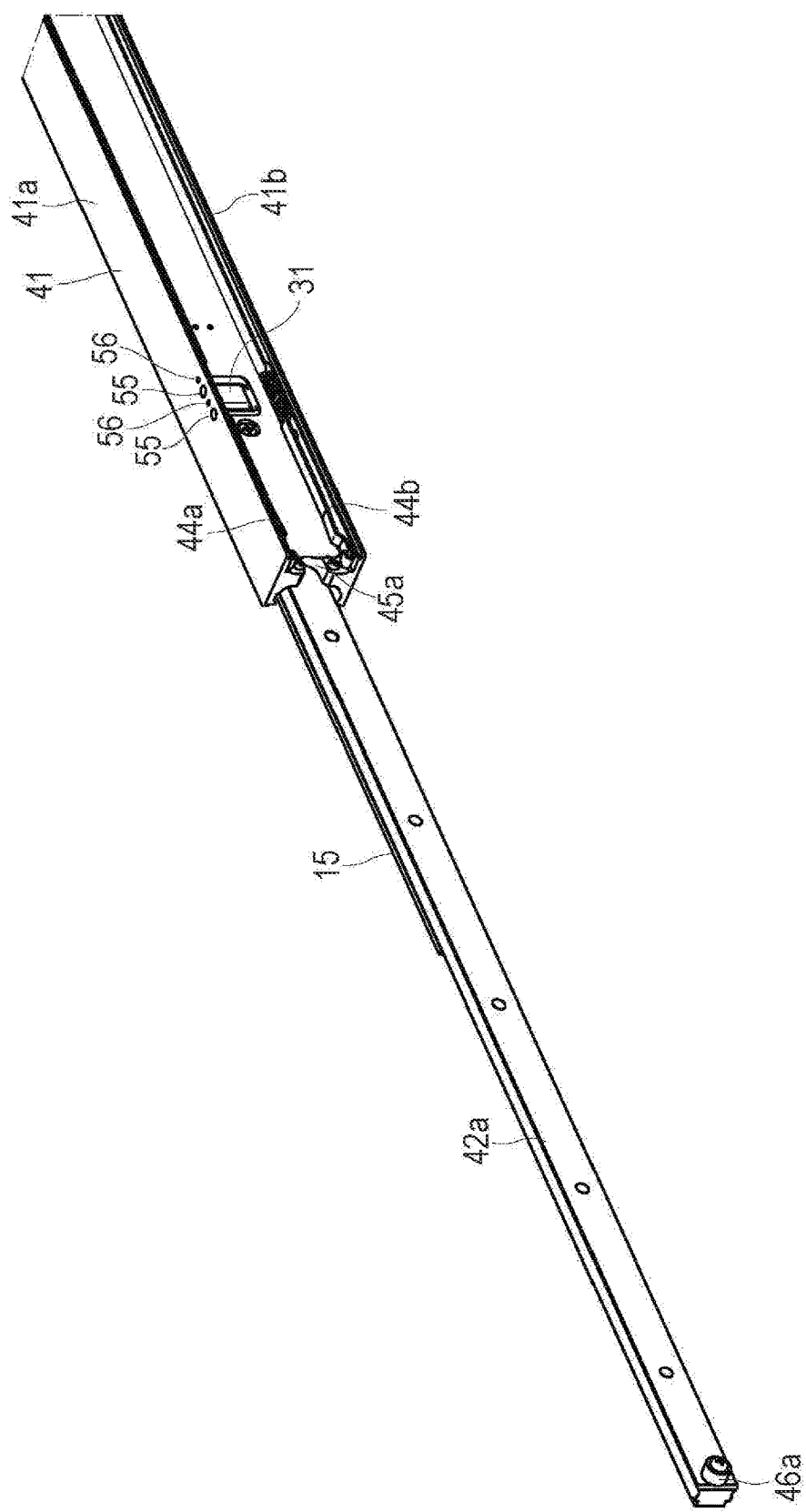
FIG. 10 is a partial enlarged view of FIG. 9.
Figure 11:
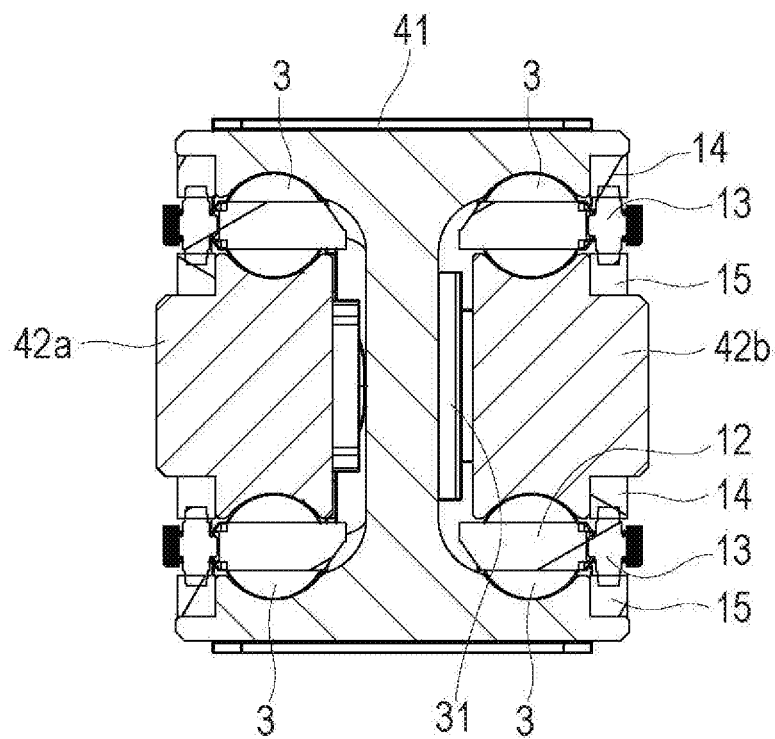
FIG. 11 is a cross-sectional view taken along line X-X of FIG. 8.

FIGS. 8 to 11 illustrate a slide rail of a second embodiment of the present invention. FIG. 8 illustrates pull-in positions of inner rails 42a and 42b. FIG. 9 illustrates pull-out positions of the inner rails 42a and 42b. FIG. 10 illustrates a partial enlarged view of FIG. 9. FIG. 11 illustrates a cross-sectional view taken along line X-X of FIG. 8.

The slide rail of the second embodiment also includes an outer rail 41 with an H-shaped cross section, and the pair of inner rails 42a and 42b assembled between a pair of side walls 41a and 41b of the outer rail 41 in such a manner as to be movable in a length direction.

The inner rails 42a and 42b are simply different in the pull-out direction and have the same configuration. To make it easy to understand, the configurations of the right inner rail 42b and the right half of the outer rail 41 are described below. The same reference numerals are assigned to components of the left inner rail 42a and the left half of the outer rail 41, and their description is omitted.

As illustrated in FIG. 11, also in the slide rail of the second embodiment, the plurality of balls 3 is interposed between the outer rail 41 and the inner rail 42b. The plurality of balls 3 is held in a chain by the cage 12. The racks 14 and 15 and the pinion 13 prevent the cage 12 from being displaced. The ball 3, the cage 12, the racks 14 and 15, and the pinion 13 have the same configurations as those of the slide rail of the first embodiment. Accordingly, the same reference numerals are assigned to the ball 3, the cage 12, the racks 14 and 15, and the pinion 13, and their description is omitted.

As illustrated in FIGS. 9 and 10, in order to further improve the rigidity of the outer rail 41, the method for fixing a pair of plate spring portions 44a and 44b is changed, and the notches of the outer rail 41 where the pair of plate spring portions 44a and 44b is housed are eliminated, in the slide rail of the second embodiment. Moreover, a pin 43 (refer to FIG. 12) as a shaft is provided to the inner rail 42b, and both end portions of the pin 43 are in contact with the pair of plate spring portions 44a and 44b.

As illustrated in FIG. 9, the pair of plate spring portions 44a and 44b and a notch 45b as a first stopper are provided to the outer rail 41 to hold the inner rail 42b at the pull-in position (predetermined position). The plate spring portions 44a and 44b are placed at a front end portion (one end portion) of the outer rail 41. The notch 45b is placed at a rear end portion (the other end portion) of the outer rail 41. Although not illustrated, the same notch 45b as a notch 45a at the front end portion of the outer rail 41 is formed at the rear end portion of the outer rail 41.

The pin 43 (also refer to FIG. 12) as an engagement body and a second stopper 46b are provided to the inner rail 42b to hold the inner rail 42b at the pull-in position. The pin 43 is placed at a front end portion (one end portion) of the inner rail 42b. The second stopper 46b is placed at a rear end portion (the other end portion) of the inner rail 42b. Although not illustrated, the same second stopper 46b as a second stopper 46a at the front end portion of the inner rail 42a is provided at the rear end portion of the inner rail 42b. When the inner rail 42b is at the pull-in position, the pin 43 is sandwiched between the pair of plate spring portions 44a and 44b, and the second stopper 46b is in contact with the notch 45b as the first stopper.

When the inner rail 42b is pulled out, the inner rail 42b is held at the pull-out position. As in the slide rail of the first embodiment, the plate spring portion 31 for holding the inner rail 42b at the pull-out position is provided to the outer rail 41. The plate spring portion 31 has the same configuration as the slide rail of the first embodiment. Accordingly, the same reference numeral is assigned and its description is omitted.

Figure 12:
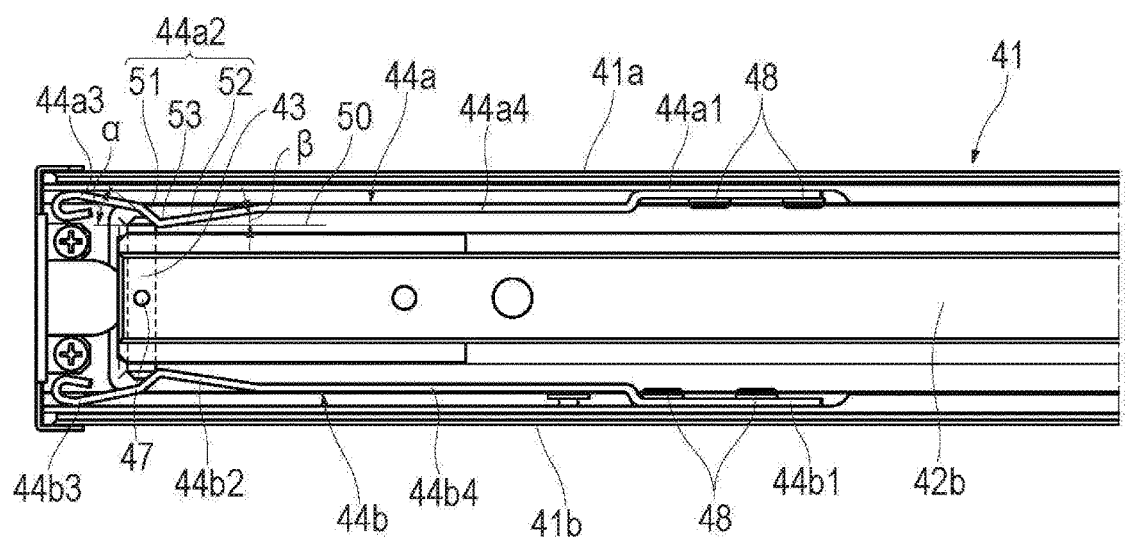
FIG. 12 is a side view of the slide rail of the second embodiment of the present invention.

FIG. 12 illustrates a side view of the inner rail 42b. The pin 43 penetrates the front end portion of the inner rail 42b. The pin 43 is oriented in a direction orthogonal to the length direction of the inner rail 42b. The pin 43 is fixed to the inner rail 42b by a screw 47 as a fastening member.

The pair of plate spring portions 44a and 44b is fixed to the pair of side walls 41a and 41b of the outer rail 41. The plate spring portions 44a and 44b are long and slender in the length direction of the outer rail 41, and are substantially parallel to each other. The plate spring portions 44a and 44b include proximal end portions 44a1 and 44b1, extension portions 44a4 and 44b4, bend portions 44a2 and 44b2, and distal end portions 44a3 and 44b3.

The proximal end portions 44a1 and 44b1 are fixed by screws 48 as fastening members to the side walls 41a and 41b of the outer rail 41. As illustrated in FIG. 10, the proximal end portions 44a1 and 44b1 are fixed to the side walls 41a and 41b, using screw holes 56 and access holes 55, which are provided in the side walls 41a and 41b of the outer rail 41. In other words, the upper side wall 41a of the outer rail 41 is provided with the screw hole 56 for fixing the plate spring portion 44a to the side wall 41a, and the access hole 55 into which a driver (tool) for fixing the plate spring portion 44b to the side wall 41b is inserted. Likewise, the lower side wall 41b of the outer rail 41 is provided with a screw hole (not illustrated) for fixing the plate spring portion 44b to the side wall 41b, and an access hole (not illustrated) for fixing the plate spring portion 44a to the side wall 41a. The access hole 55 of the side wall 41a and the screw hole of the side wall 41b face each other. The screw hole 56 of the side wall 41a and the access hole of the side wall 41b face each other. Hence, it is possible to insert the driver into the access hole 55 from outside the side wall 41a and fix the plate spring portion 44b to the side wall 41b. Likewise, it is possible to insert the driver into the access hole from outside the side wall 41b, and fix the plate spring portion 44a to the side wall 41a.

As illustrated in FIG. 12, the bend portions 44a2 and 44b2 bend in such a manner that a minimum dimension between the plate spring portions 44a and 44b is smaller than the axial length (dimension) of the pin 43. First linear inclined portions 51 are formed on the pin 43 side with respect to minimum dimension positions 53 of the bend portions 44a2 and 44b2. A first angle α formed by the first inclined portion 51 and a length direction 50 is set to equal to or greater than 30° and equal to or less than 70°, more preferably equal to or greater than 40° and equal to or less than 50°. Second linear inclined portions 52 are formed on the opposite side to the first inclined portions 51 across the minimum dimension positions 53 of the bend portions 44a2 and 44b2. A second angle β formed by the second inclined portion 52 and the length direction 50 is set smaller than the first angle α, for example, equal to or greater than 5° and equal to or less than 30°.

The extension portions 44a4 and 44b4 link the bend portions 44a2 and 44b2 and the proximal end portions 44a1 and 44b1. The extension portions 44a4 and 44b4 and the side walls 41a and 41b are parallel to each other. There is clearance between the extension portions 44a4 and 44b4 and the side walls 41a and 41b.

The distal end portions 44a3 and 44b3 are folded in a substantially arc shape. The distal end portions 44a3 and 44b3 are not fixed to the side walls 41a and 41b of the outer rail 41, and are supported by the side walls 41a and 41b (support surfaces) of the outer rail 41 in such a manner as to be movable in the length direction. The distal end portions 44a3 and 44b3 are in contact with the side walls 41a and 41b.

When the inner rail 42b is at the pull-in position as illustrated in FIG. 12, the inner rail 42b is biased in the pull-in direction by the plate spring portions 44a and 44b. Hence, the pull-in position of the inner rail 42b is held.

Figure 13A:
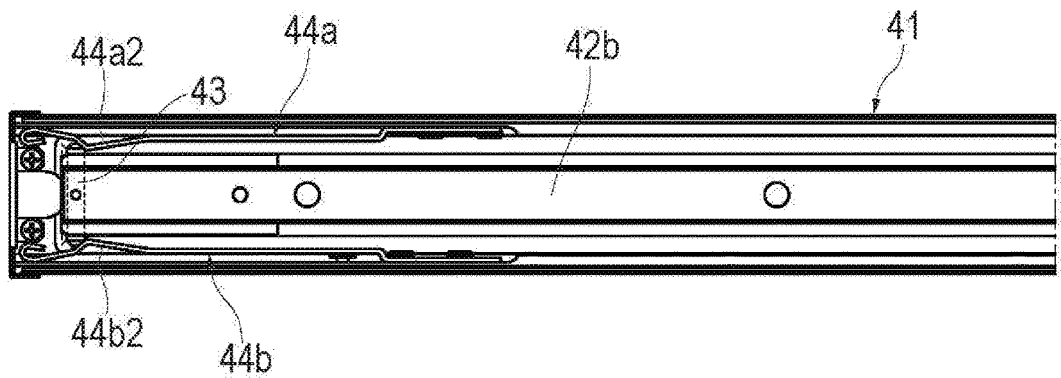
FIGS. 13A to 13C are operation diagrams of when the inner rail at a pull-in position is pulled out (FIG. 13A illustrates the pull-in position of the inner rail, FIG. 13B illustrates a state immediately after a pin passes the minimum dimension positions of the plate spring portions, and FIG. 13C illustrates a state after the pin passes the minimum dimension positions of the plate spring portions).
Figure 13B:
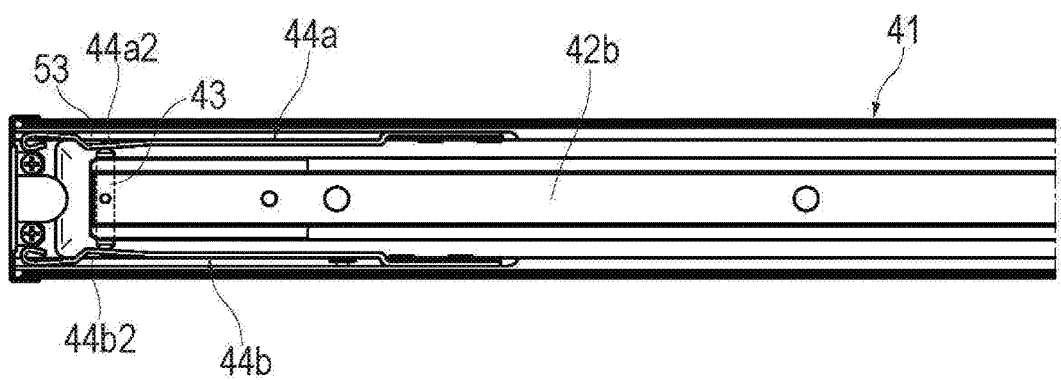
Figure 13C:
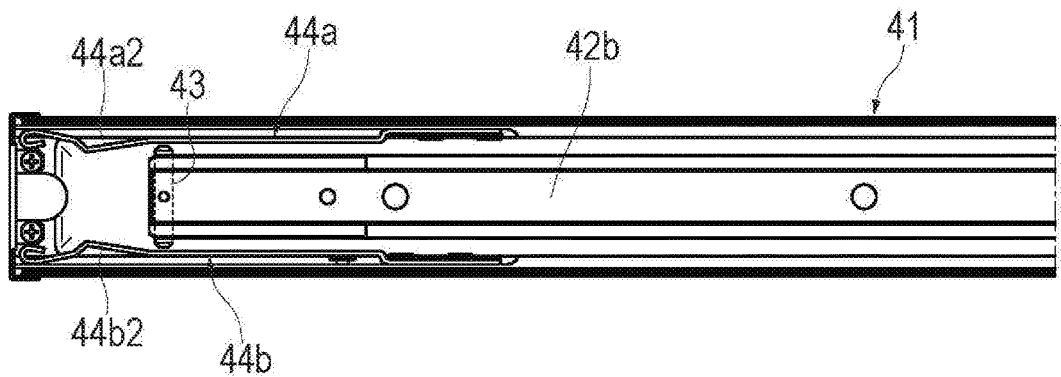

FIGS. 13A to 13C illustrate operation diagrams of when the inner rail 42*b* at the pull-in position is pulled out. FIG. 13A illustrates the pull-in position of the inner rail 42*b*. FIG. 13B illustrates a state immediately after the pin 43 passes the minimum dimension positions 53 of the plate spring portions 44*a* and 44*b*. FIG. 13C illustrates a state after the pin 43 passes the minimum dimension positions 53 of the plate spring portions 44*a* and 44*b*.

As illustrated in FIGS. 13A and 13B, when the inner rail 42*b* at the pull-in position is pulled out, the pin 43 bends the plate spring portions 44*a* and 44*b* in such a manner as to expand the bend portions 44*a*2 and 44*b*2. When the pin 43 bends the plate spring portions 44*a* and 44*b*, a strong spring force occurs on the plate spring portions 44*a* and 44*b*. Hence, a holding force that holds the inner rail 42*b* at the pull-in position can be increased. The first angle α of the first inclined portion 51 is set to equal to or greater than 30° and equal to or less than 70° to further increase the holding force.

Moreover, at this point in time, the distal end portions 44*a*3 and 44*b*3 of the plate spring portions 44*a* and 44*b* slide along the support surfaces of the outer rail 41, and the plate spring portions 44*a* and 44*b* deform in such a manner as to stretch. Hence, it is possible to prevent the occurrence of excessive stress on the plate spring portions 44*a* and 44*b*.

As illustrated in FIG. 13B, after the pin 43 passes the minimum dimension positions 53, the second inclined portions 52 apply a force in the pull-out direction to the pin 43. Hence, the inner rail 42*b* can be smoothly pulled out.

The slide rail of the second embodiment further has the following effect: There is no need to form, in the outer rail 41, notches where the plate spring portions 44*a* and 44*b* are housed, and accordingly, rigidity in the end portion of the outer rail 41 can be improved. When the inner rail 42*b* is at the pulled-out position as illustrated in FIG. 9, if a force in the up-and-down direction is applied to the distal end of the inner rail 42*b*, a force that attempts to open the pair of side walls 41*a* and 41*b* is applied to the outer rail 41. The rigidity in the end portion of the outer rail 41 is improved. Accordingly, it is possible to endure the force.

The pin 43 forms the engagement body. Accordingly, the manufacture of the engagement body is easy.

The access holes 55 and the screw holes 56 are provided in the side walls 41*a* and 41*b* of the outer rail 41. Accordingly, the plate spring portions 44*a* and 44*b* can be easily fixed to the side walls 41*a* and 41*b*. There is no need to provide the screw holes 56 in the plate spring portions 44*a* and 44*b*. Accordingly, the fixing strength of the plate spring portions 44*a* and 44*b* is also increased.

Figure 14:
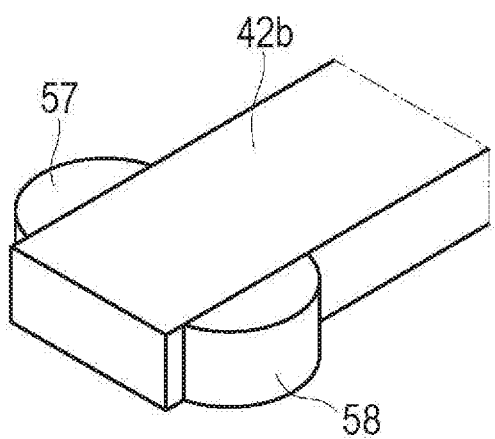
FIG. 14 is a perspective view illustrating a modification of the inner rail of the slide rail of the second embodiment of the present invention.

FIG. 14 illustrates a modification of the inner rail 42*b* of the second embodiment. It is also possible to provide a pair of semicircular cylindrical bodies 57 and 58, instead of the pin 43, to the inner rail 42*b* to further increase the holding force at the pull-in position.

The present invention is not limited to the concretization of the embodiments, and can be changed to various embodiments within the scope that does not change the purport of the present invention.

In the embodiments, the example of two inner rails, what is called a double slide, has been described. However, it is also possible to have one inner rail.

In the embodiments, the example where the guide apparatus is the slide rail including the inner rails and the outer rail has been described. However, the guide apparatus may be a linear guide including a rail and a block.

In the embodiments, one end portion, in the length direction, of the plate spring portion is fixed to the outer rail. The other end portion in the length direction is slidably supported by the outer rail. However, it is also possible to fix both end portions, in the length direction, of the plate spring portion to the outer rail to further increase the holding force.

In the embodiments, the other end portion, in the length direction, of the plate spring portion is always in contact with the support surface of the outer rail. However, the other end portion of the plate spring portion is simply required to be in contact with the support surface when the shaft is at the pull-in position.

The present description is based on Japanese Patent Application No. 2015-134157 filed on Jul. 3, 2015, and Japanese Patent Application No. 2016-127282 filed on Jun. 28, 2016, the entire contents of which are incorporated herein.

REFERENCE SIGNS LIST

1 Outer rail (first member)
2*a*, 2*b* Inner rail (second member)
3 Ball (rolling element)
21 Shaft (engagement body)
18 Stopper
22*a*, 22*b* Plate spring portion
23 One end portion of the plate spring portion
24 The other end portion of the plate spring portion
25 Support surface
26 First inclined portion
27 Second inclined portion
29 Minimum dimension position
30 Length direction
d Diameter of the shaft (dimension of the engagement body)
w Minimum dimension between the plate spring portions
α First angle
β Second angle
41 Outer rail (first member)
42*a*, 42*b* Inner rail (second member)
43 Pin (shaft, engagement body)
44*a*, 44*b* Plate spring portion
44*a*1, 44*b*1 Proximal end portion (one end portion) of the plate spring portion
44*a*3, 44*b*3 Distal end portion (the other end portion) of the plate spring portion
45*a*, 45*b* Notch (first stopper)
46*a*, 46*b* Second stopper
51 First inclined portion
52 Second inclined portion
53 Minimum dimension position
50 Length direction
55 Access hole
56 Screw hole

The invention claimed is:

1. A guide apparatus comprising:
a first member;
a second member assembled to the first member in such a manner as to be relatively movable in a length direction;
an engagement body placed on the second member; and
a pair of plate spring portions placed on the first member in such a manner as to sandwich the engagement body, wherein
the pair of plate spring portions bends in such a manner that a minimum dimension between the pair of plate spring portions is smaller than a dimension of the engagement body, and
in a state where the engagement body has gone beyond a minimum dimension position between the pair of plate spring portions and the second member is being held at a predetermined position on the first member, the minimum dimension between the pair of plate spring portions is smaller than the dimension of the engagement body, and both end portions, in the length direction, of each said plate spring portion are supported by the first member, a first said end portion, in the length direction, of each said plate spring portion is fixed to the first member, a second said end portion, in the length direction, of each said plate spring portion is supported by a support surface of the first member in such a manner as to be movable in the length direction, and the second said end portions of the pair of plate spring portions bend, in convex form, toward the support surfaces of the first member.

2. The guide apparatus according to claim 1, wherein the engagement body includes a shaft that comes into contact at both axial end portions with the pair of plate spring portions.

3. The guide apparatus according to claim 2, wherein a first angle formed by a first inclined portion on the engagement body side with respect to the minimum dimension position of each plate spring position, and the length direction is set to equal to or greater than 30° and equal to or less than 70°.

4. The guide apparatus according to claim 2, wherein
the pair of plate spring portions is placed at one end portion, in the length direction, of the first member, and a first stopper is placed at the other end portion, in the length direction, of the first member, and
the engagement body is placed at one end portion, in the length direction, of the second member, and a second stopper that comes into contact with the first stopper is placed at the other end portion, in the length direction, of the second member.

5. The guide apparatus according to claim 2, wherein
the second member is movably assembled via a rolling element between a pair of side walls of the first member, and
each side wall is provided with a screw hole for fixing one of the pair of plate spring portions to one of the pair of side walls, and an access hole into which a tool for fixing the other of the pair of plate spring portions to the other of the pair of side walls is inserted.

6. The guide apparatus according to claim 1, wherein a first angle formed by a first inclined portion on the engagement body side with respect to the minimum dimension position of each plate spring position, and the length direction is set to equal to or greater than 30° and equal to or less than 70°.

7. The guide apparatus according to claim 6, wherein a second angle formed by a second inclined portion on an opposite side to the first inclined portion across the minimum dimension position of each plate spring portion, and the length direction is set smaller than the first angle.

8. The guide apparatus according to claim 7, wherein
the pair of plate spring portions is placed at one end portion, in the length direction, of the first member, and a first stopper is placed at the other end portion, in the length direction, of the first member, and
the engagement body is placed at one end portion, in the length direction, of the second member, and a second stopper that comes into contact with the first stopper is placed at the other end portion, in the length direction, of the second member.

9. The guide apparatus according to claim 7, wherein
the second member is movably assembled via a rolling element between a pair of side walls of the first member, and
each side wall is provided with a screw hole for fixing one of the pair of plate spring portions to one of the pair of side walls, and an access hole into which a tool for fixing the other of the pair of plate spring portions to the other of the pair of side walls is inserted.

10. The guide apparatus according to claim 6, wherein
the pair of plate spring portions is placed at one end portion, in the length direction, of the first member, and a first stopper is placed at the other end portion, in the length direction, of the first member, and
the engagement body is placed at one end portion, in the length direction, of the second member, and a second stopper that comes into contact with the first stopper is placed at the other end portion, in the length direction, of the second member.

11. The guide apparatus according to claim 6, wherein
the second member is movably assembled via a rolling element between a pair of side walls of the first member, and
each side wall is provided with a screw hole for fixing one of the pair of plate spring portions to one of the pair of side walls, and an access hole into which a tool for fixing the other of the pair of plate spring portions to the other of the pair of side walls is inserted.

12. The guide apparatus according to claim 1, wherein
the pair of plate spring portions is placed at one end portion, in the length direction, of the first member, and a first stopper is placed at the other end portion, in the length direction, of the first member, and
the engagement body is placed at one end portion, in the length direction, of the second member, and a second stopper that comes into contact with the first stopper is placed at the other end portion, in the length direction, of the second member.

13. The guide apparatus according to claim 12, wherein
the second member is movably assembled via a rolling element between a pair of side walls of the first member, and
each side wall is provided with a screw hole for fixing one of the pair of plate spring portions to one of the pair of side walls, and an access hole into which a tool for fixing the other of the pair of plate spring portions to the other of the pair of side walls is inserted.

14. Equipment using the guide apparatus according to claim 1.

15. The guide apparatus according to claim 1, wherein
the second member is movably assembled via a rolling element between a pair of side walls of the first member, and
each side wall is provided with a screw hole for fixing one of the pair of plate spring portions to one of the pair of side walls, and an access hole into which a tool for fixing the other of the pair of plate spring portions to the other of the pair of side walls is inserted.

16. A guide apparatus comprising:
a first member;
a second member assembled to the first member in such a manner as to be relatively movable in a length direction;
an engagement body placed on the second member; and
a pair of plate spring portions placed on the first member in such a manner as to sandwich the engagement body, wherein the pair of plate spring portions bends in such a manner that a minimum dimension between the pair of plate spring portions is smaller than a dimension of the engagement body, and in a state where the engagement body has gone beyond a minimum dimension position between the pair of plate spring portions and the second member is being held at a predetermined position on the first member, the minimum dimension between the pair of plate spring portions is smaller than the dimension of the engagement body, and both end portions, in the length direction, of each said plate spring portion are supported by the first member, the second member is movably assembled via a rolling element between a pair of side walls of the first member, and each side wall is provided with a screw hole for fixing one of the pair of plate spring portions to one of the pair of side walls, and an access hole into which a tool for fixing the other of the pair of plate spring portions to the other of the pair of side walls is inserted.

\* \* \* \* \*